US011727770B2

(12) United States Patent
Shen et al.

(10) Patent No.: US 11,727,770 B2
(45) Date of Patent: Aug. 15, 2023

(54) EMERGENCY EVACUATION PROCESS

(71) Applicant: I-Ting Shen, Tainan (TW)

(72) Inventors: I-Ting Shen, Tainan (TW);
Chun-Meng Shen, Tainan (TW)

(73) Assignee: I-Ting Shen, Tainan (TW)

( * ) Notice: Subject to any disclaimer, the term of this patent is extended or adjusted under 35 U.S.C. 154(b) by 433 days.

(21) Appl. No.: 17/123,237

(22) Filed: Dec. 16, 2020

(65) Prior Publication Data

US 2022/0148393 A1    May 12, 2022

(51) Int. Cl.
| | | |
|---|---|---|
| *G08B 7/06* | (2006.01) | |
| *E05B 65/00* | (2006.01) | |
| *E05B 63/00* | (2006.01) | |
| *G05B 15/02* | (2006.01) | |
| *G08B 19/00* | (2006.01) | |
| *G08B 17/06* | (2006.01) | |
| *G01C 21/20* | (2006.01) | |

(52) U.S. Cl.
CPC .......... *G08B 7/066* (2013.01); *E05B 63/0069* (2013.01); *E05B 65/0003* (2013.01); *G01C 21/206* (2013.01); *G05B 15/02* (2013.01); *G08B 17/06* (2013.01); *G08B 19/00* (2013.01)

(58) Field of Classification Search
CPC ........ G08B 7/066; G08B 17/06; G08B 19/00; G08B 13/1672; G08B 27/006; G08B 25/00; E05B 63/0069; E05B 65/0003; G01C 21/206; G05B 15/02
See application file for complete search history.

(56) References Cited

U.S. PATENT DOCUMENTS

| | | | | |
|---|---|---|---|---|
| 9,830,932 | B1* | 11/2017 | Gunderson | G08B 5/22 |
| 9,886,831 | B1* | 2/2018 | Svoboda | G08B 7/06 |
| 10,648,198 | B1* | 5/2020 | Shen | E05B 63/0065 |
| 10,769,741 | B2* | 9/2020 | Braun | H04W 4/90 |
| 10,861,308 | B1* | 12/2020 | Simpson | G08B 17/08 |
| 11,492,017 | B2* | 11/2022 | Tamagaki | B60K 28/06 |
| 11,508,228 | B2* | 11/2022 | Daniel | G16H 40/20 |
| 11,545,012 | B2* | 1/2023 | Connell, II | H04L 41/06 |
| 11,580,843 | B2* | 2/2023 | Menard | G08B 25/006 |
| 2012/0190325 | A1* | 7/2012 | Abu-Hakima | H04L 12/1895 |
| | | | | 455/404.2 |
| 2013/0346333 | A1* | 12/2013 | Hassler | H04W 4/90 |
| | | | | 705/325 |
| 2015/0070166 | A1* | 3/2015 | Boyden | G08B 25/012 |
| | | | | 340/540 |
| 2015/0194033 | A1* | 7/2015 | Esposito | G08B 21/02 |
| | | | | 340/686.6 |
| 2015/0339913 | A1* | 11/2015 | Lyman | G08B 25/12 |
| | | | | 340/287 |

(Continued)

*Primary Examiner* — Ramesh B Patel
(74) *Attorney, Agent, or Firm* — Alan D. Kamrath; Karin L. Williams; Mayer & Williams PC (57) ABSTRACT

An emergency evacuation process includes setting at least one emergency refuge area in a place and creating an electronic map based on the disposition of the place. A plurality of door locks mounted in the place is connected with a control device. A gunshot event information containing the gunshot location is sent to a server when a gunshot event is detected. The server indicates the gunshot location and the suggested emergency refuge area on the electronic map. Each person in the place can rapidly know the gunshot location and the emergency refuge area to avoid direct encounter with the gunman.

17 Claims, 5 Drawing Sheets

(56) References Cited

U.S. PATENT DOCUMENTS

| | | | |
|---|---|---|---|
| 2018/0053394 A1* | 2/2018 | Gersten | H04N 9/8205 |
| 2019/0080577 A1* | 3/2019 | Raz | G01H 3/10 |
| 2019/0130723 A1* | 5/2019 | Thiel | E05C 19/18 |
| 2019/0295397 A1* | 9/2019 | Eckert | G08B 5/36 |
| 2020/0211362 A1* | 7/2020 | Shen | G08B 25/10 |
| 2022/0148393 A1* | 5/2022 | Shen | E05B 63/0069 |

\* cited by examiner

EMERGENCY EVACUATION PROCESS

BACKGROUND OF THE INVENTION

The present invention relates to an emergency evacuation process and, more particularly, to an emergency evacuation process that immediately indicates the emergency event location and suggests the evacuation route when an emergency event, such as a gunshot event, occurs.

In an area having many buildings and permitting many people to access, such as a school, it is difficult to find persons with bad intentions, such as a person carrying a gun and entering a school. Therefore, gunshot events in schools are heard from time to time. Very often, there are many people in such an area, such that the casualty is high when an emergency event, such as a gunshot event, occurs. Furthermore, it is difficult for a manager to inform all people in the area to evacuate within a short period of time, leading to more casualty.

BRIEF SUMMARY OF THE INVENTION

To solve the above drawback, the present invention provides an emergency evacuation process comprising:

installing an emergency evacuation application into a personal device, executing the emergency evacuation application, and connecting the personal device with a server;

connecting a plurality of door locks in a place with a control device, with the control device obtaining control authority of each of the plurality of door locks and being in connection with the server;

connecting an unlocking device with the control device, with the control device identifying the unlocking device, wherein the control device actuates and sets all of the plurality of door locks to a locking state when the unlocking device is identified as being incorrect, and wherein each of all of the plurality of door locks obtains unlocking authority when the unlocking device is identified as being correct;

detecting whether a gunshot event occurs, wherein each of the plurality of door locks retains the unlocking authority when no gunshot event is detected, wherein a gunshot event information containing a gunshot location of the gunshot event is sent to the server when the gunshot event is detected;

setting at least one of the plurality of door locks near the gunshot location to the locking state and revoking the unlocking authority of the at least one of the plurality of door locks, and entering a gunshot control state;

indicating the gunshot location on the personal device through the emergency evacuation application;

indicating a pre-set emergency refuge area on the personal device through the emergency evacuation application;

selectively lifting the gunshot control state after logging in the server, wherein when the gunshot control state is lifted, the at least one of the plurality of door locks near the gunshot location restores the unlocking authority.

The emergency evacuation process according to the present invention rapidly provides the gunshot location and the suggested emergency refuge area after entrance of the gunshot control state. Thus, the persons in the place can immediately know the gunshot location and where to take refuge, reducing the casualty.

In an example, the pre-set emergency refuge area is selected from a plurality of emergency refuge areas in the place.

In an example, the pre-set emergency refuge area is one of the plurality of emergency refuge areas that is farthest to the gunshot location.

In an example, the pre-set emergency refuge area is one of the plurality of emergency refuge areas that is nearest to a person holding the personal device.

In an example, at least one of the gunshot location and the pre-set emergency refuge area is described by text. Thus, each person in the building where the gunshot event occurs can avoid direct encounter with the gunman while taking refuge.

In an example, the emergency evacuation process further comprises creating an electronic map based on disposition of the place and storing the electronic map in the server. Indicating the gunshot location includes indicating the gunshot location by a symbol on the electronic map when the gunshot control state is entered. Indicating the pre-set emergency refuge area includes indicating the pre-set emergency refuge area by another symbol when the gunshot control state is entered.

In an example, the symbol indicating the gunshot location is a square, and the another symbol indicating the pre-set emergency refuge area is a star.

In an example, the emergency evacuation process further comprises reporting a personal location indicative of a location of the person holding the personal device to the server, and labeling the personal location on the electronic map by a dot.

In an example, reporting the personal location is based on connection between the personal device and one of the plurality of door locks, and the one of the plurality of door locks connected to the personal location is identified as the personal location.

In an example, the emergency evacuation process further comprises:

determining whether to change the gunshot location, wherein a new gunshot location is designated when a new gunshot event is detected, and wherein the gunshot location is not changed when no new gunshot event is detected; and determining whether to change the pre-set emergency refuge area, wherein the pre-set emergency refuge area is not changed when the new gunshot location is same as or near the pre-set emergency refuge area, and wherein when the new gunshot location is not the same as nor near the pre-set emergency refuge area, a new emergency refuge area is indicated.

Thus, the emergency evacuation process according to the present invention can immediately change the suggested emergency refuge area according to the newest gunshot location, enabling the person to avoid the gunner.

In an example, the emergency evacuation process further comprises reporting the fire location of at least one fire detecting device that has detected the fire to the server, and labeling the fire location with a flame symbol on the fire location electronic map.

After entering the fire control state, the emergency evacuation process according to the present invention provides the personal location of the person holding the personal device and the gunshot location, such that the person can rapidly judge whether he or she is in a safe place and where to evacuate.

The present invention will become clearer in light of the following detailed description of illustrative embodiments of this invention described in connection with the drawings.

DETAILED DESCRIPTION OF THE INVENTION

Figure 1:
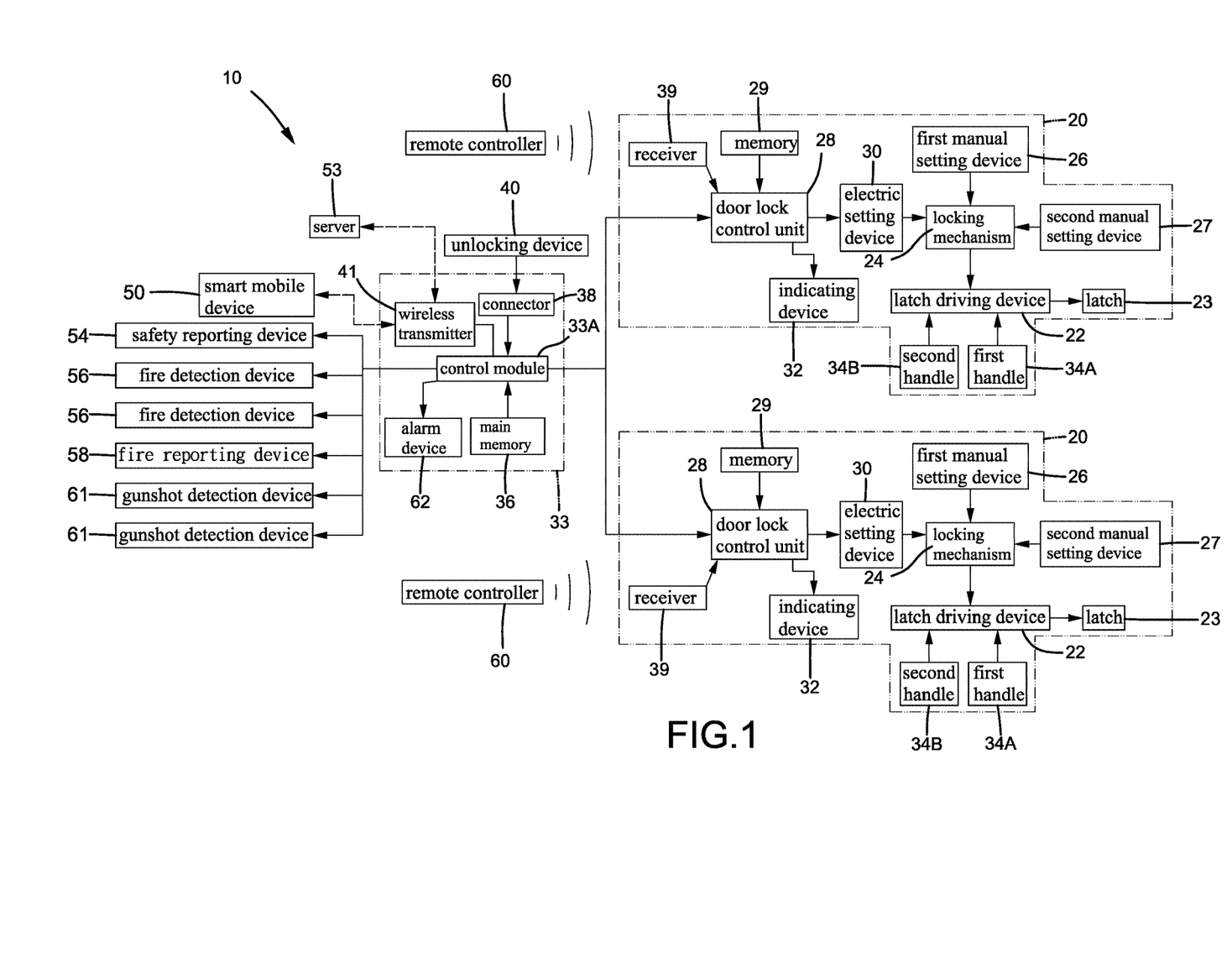
FIG. 1 is a diagrammatic block diagram of a central access control system capable of carrying out an emergency evacuation process according to the present invention.

FIG. 1 shows a diagrammatic block diagram of a central access control system 10 capable of carrying out an emergency evacuation process according to the present invention. The central access control system 10 is disposed in a place 68 having a plurality of doors. The place 68 can be a school, a building, etc. The central access control system 10 includes a plurality of door locks 20 mounted on the plurality of doors of the place 68. Each door is mounted in a passage to a space, such as a classroom.

Each of the plurality of door locks 20 includes a latch driving device 22 and a latch 23 actuatable by the latch driving device 22 to move between a latching position and an unlatching position. Each of the plurality of door locks 20 further includes a locking mechanism 24 for prohibiting operation of the latch driving device 22, a first manual setting device 26, a second manual setting device 27, an electric setting device 30, a door lock control unit 28 electrically connected to the electric setting device 30, and an indicating device 32. The first and second manual setting devices 26 and 27 are configured to set the locking mechanism 24 to a locking state or an unlocked state. Each indicating device 32 can include a lighting member capable of generating a green light and a red light and/or a speaker or a buzzer for generating sound. Each indicating device 32 is mounted to an inner side of a respective door. Each door lock 20 further includes a memory 29 electrically connected to the door lock control unit 28.

The first manual setting device 26 of each of the plurality of door locks 20 is mounted to the inner side of a respective door. The second manual setting device 27 of each of the plurality of door locks 20 is mounted to an outer side of a respective door. The first and second manual setting devices 26 and 27 can be key cylinders of any desired form as conventional including but not limited to of a commercially available type. A key can be used to release the locking state of the first manual setting device 26 or the second manual setting device 27. Thus, the locking mechanism 24 can be set to the locking state or the unlocked state. Each of the plurality of door locks 20 further includes a first handle 34A mounted to the outer side of the respective door (such as the outside) and operatively connected to the latch driving device 22. Each of the plurality of door docks 20 further includes a second handle 34B mounted to the inner side of the respective door (such as the inside) and operatively connected to the latch driving device 22.

The electric setting device 30 is also used to set the locking mechanism 24 to the locking state or the unlocked state. In a case that the locking mechanism 24 is set to the locking state by the electric setting device 30, it is impossible to set the locking mechanism 24 to the unlocked state by the first manual setting device 26 or the second manual setting device 27. Nevertheless, when the locking mechanism 24 is set to the unlocked state by the electric setting device 30, the locking mechanism 24 can be set to the locking state or the unlocked state by the first manual setting device 26 or the second manual setting device 27. Furthermore, when the locking mechanism 24 is set to the locking state by the first manual setting device 26 or the second manual setting device 27, the latch 23 cannot move to the unlatching position by operating the first handle 34A but can move to the unlatching position by operating the second handle 34B at the inner side of the respective door. On the other hand, when the locking mechanism 24 is set to the unlocked state by the electric setting device 30 and the first manual setting device 26 (or the second manual setting device 27), the latch 23 can move to the unlatching position by operating the first handle 34A or the second handle 34B, permitting subsequent opening of the respective door.

The central access control system 10 further includes a remote controller 60. Each of the plurality of door locks 20 further includes a receiver 39 electrically connected to the door lock control unit 28. The remote controller 60 and the receivers 39 can be operated to set at least one of the plurality of door locks 20 into the locking state within a predetermined range. For example, when at least one door lock 20 within the transmission area of the remote controller 60 receives a signal from the remote controller 60, the at least one door lock 20 within the transmission area of the remote controller 60 is set to the locking state.

Furthermore, an emergency state identification information is stored in the remote controller 60. When the remote controller 60 is used to set the plurality of door locks 20 to the locking state, the emergency state identification information received by a respective door lock 20 is compared with the comparison identification information in the respective memory 29. When the emergency state identification information is identified as being correct, the respective door lock 20 receiving the emergency state identification information from the remote controller 60 will be set to the locking state and will lose the unlocking authority.

The central access control system 10 further includes a control device 33 having a control module 33A, a main memory 36 electrically connected to the control module 33A, a connector 38 electrically connected to the control module 33A, and a wireless transmitter 41 electrically connected to the control module 33A. The connector 38 can include an elongated slot that receives electrodes. The control module 33A is electrically connected to the door lock control units 28 of the plurality of door locks 20. The main memory 36 stores a comparison identification information corresponding to an enabling identification information of an unlocking device 40.

The central access control system 10 further includes a safety reporting device 54 electrically connected to the control module 33A of the control device 33, a plurality of fire detection devices 56 electrically connected to the control module 33A, a fire reporting device 58 electrically connected to the control module 33A, and a plurality of gunshot detection devices 61 electrically connected to the control module 33A. The control device 33 further includes an alarm device 62 electrically connected to the control module 33A. The control device 33 can activate the alarm device 62 to generate an alarm message, such as sound, light, or both.

The safety reporting device 54 is connected to the police system to inform the police system of emergency. The plurality of fire detection devices 56 is disposed in various buildings 78 of the place 68 to detect whether a fire occurs and to report the fire to the control module 33A. The fire reporting device 58 is connected to a fire system to inform the fire. The plurality of gunshot detection devices 61 is used to detect is there any ammunition in a specific range therearound. The plurality of gunshot detection devices 61 can, but should not be limited to, use a sound detection technique or an audio wave detection technique to determine whether a sound detected is a gunshot. An example of the gunshot detection system is disclosed in U.S. Pat. No. 9,830,932. The central access control system 10 further includes a server 53 connected to the control device 33 and a smart mobile device 50 connected to the control device 33. The smart mobile device 50 can be connected to the control device 33 via the wireless transmitter 41 and, thus, can log in the server 53.

The control device 33 is configured to match with the unlocking device 40. The unlocking device 40 can be a door access card and is configured to control the control device 33. A comparison identification information corresponding to the enabling identification information of the unlocking device 40 is stored in the memory 29 of each of the plurality of door locks 20.

Figure 4:
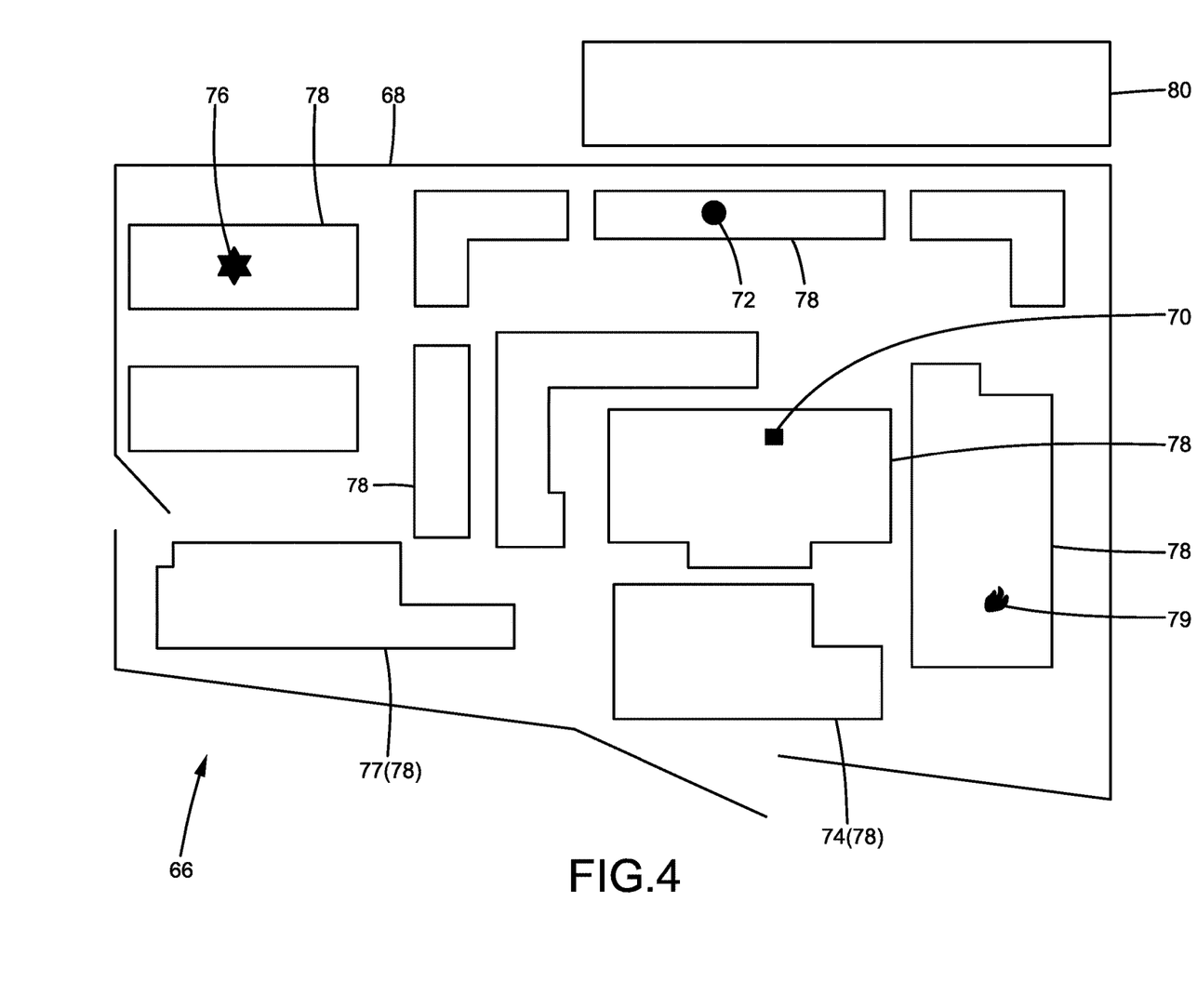
FIG. 4 is a diagrammatic block diagram illustrating an electronic map and a text area on a personal device, indicating the gunshot location, the fire event location, and a designated emergency refuge area.
Figure 5:
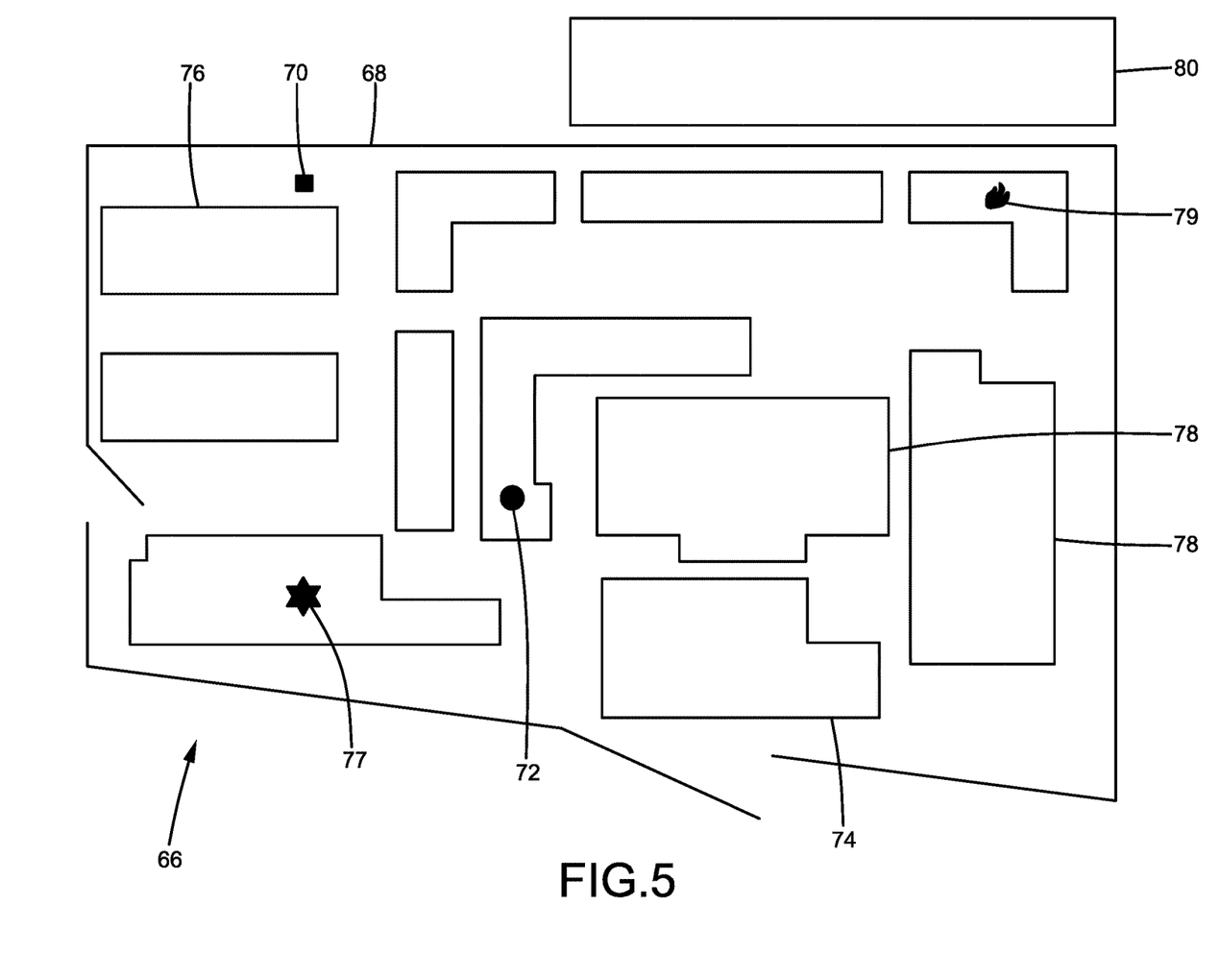
FIG. 5 is another diagrammatic block diagram illustrating the electronic map and the text area on the personal device, indicating a different gunshot location, a different fire event location, and another designated emergency refuge area.

In an example of carrying out the emergency evacuation process according to the present invention using the central access control system 10, for the sake of explanation, it will be assumed that the place 68 is a school. Firstly, in step S711, an electronic map 66 is created. Specifically, the electronic map 66 is created based on a plot plan of the place 68 and is stored in a server. The electronic map 66 shows the distribution of the plurality of buildings 78 in the school, as shown in FIGS. 4 and 5. The electronic map 66 can also include the floor plan of each building 78. The floor plan can include the spatial planning or distribution of each floor.

In step S713, at least one area of the place 68 is set as an emergency refuge area. In this embodiment, a first emergency refuge area 74, a second emergency area 76, and a third emergency refuge area 77 are chosen from the plurality of buildings 78. In a case that the place 68 includes only one building, the different emergency refuge areas can be different spaces in different floors.

In step S715, an emergency evacuation application (APP) is installed into a personal device and is logged in to connect with a server 53. The personal device can be a portable smart mobile device 50. The emergency evacuation APP can be installed into the smart mobile device 50. After executing the APP, an account number and a password can be used to log in the server 53 of the school (connection with the server 53). In some cases, such as a gunshot event or a fire event, the server 53 can automatically transmit the electronic map 66 to the smart mobile device 50 through the emergency evacuation APP, and the electronic map 66 can be displayed on the smart mobile device 50 (the personal device).

In step S717, the location of a person holding the personal device is reported back to the server 53. The symbol representing the location of the person holding the personal device can be a dot on the electronic map 66. Reporting of the location of the person holding the personal device can be identified by connection between the personal device and one of the plurality of door locks 20 or by connection between the personal device and a Wi-Fi device in the school. Thus, when the person holding the personal device moves, the location of the person holding the personal device can be updated through connection with different door locks 20 or the Wi-Fi device.

Figure 2:
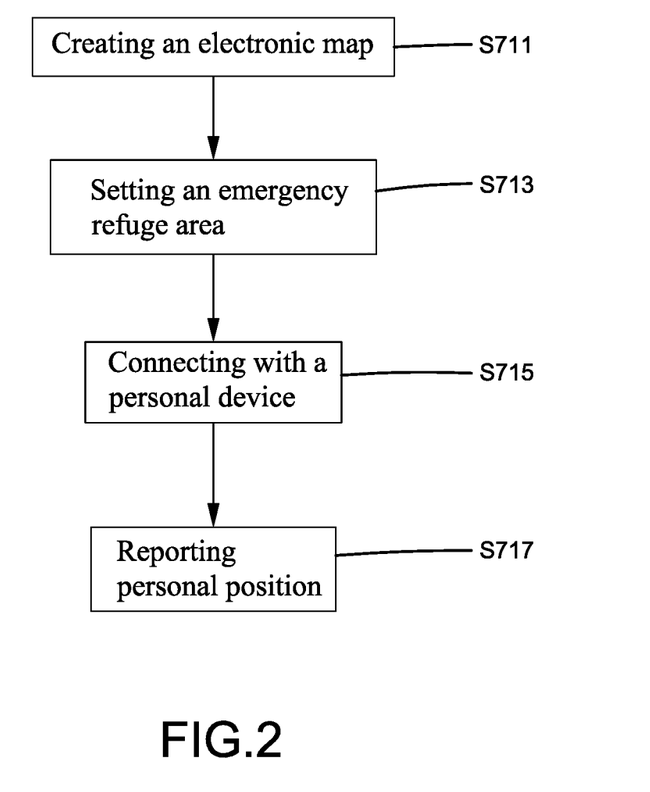
FIG. 2 is a diagrammatic flowchart illustrating the emergency evacuation process according to the present invention.

It is further assumed that each door is closed and the latches 23 are in the latching position. A connection between the plurality of door locks 20 and the control device 33 is established (step S101), such that the control device 33 obtains the control authority of the plurality of door locks 20. Specifically, the control device 33 obtains the control authority of the electric setting device 30 of each of the plurality of door locks 20. Furthermore, the control device 33 can set at least one of the locking mechanisms 24 of the plurality of door locks 20 to the locking state or the unlocked state at the same time.

Next, the unlocking device 40 is physically and removably connected to the control device 33 (step S103). As an example of the physical and removable connection, the unlocking device 40 in the form of a card is inserted into the control device 33 to be electrically connected to the connector 38, such that the control device 33 can read the enabling identification information in the unlocking device 40.

Next, the control device 33 identifies whether the unlocking device 40 is an authorized device (step S104). Specifically, the control device 33 compares the enabling identification information in the unlocking device 40 with the comparison identification information in the main memory 36. When the control device 33 identifies that the enabling identification information in the unlocking device 40 does not match with the comparison identification information in the main memory 36 (the unlocking device 40 is identified as being incorrect), the control device 33 enters a first identification failure state (S106), and the control device 33 controls the electric setting devices 30 of the plurality of door locks 20 to set the locking mechanisms 24 of the plurality of door locks 20 to the locking state without activating the safety reporting device 54. Thus, all door locks 20 lose their independent unlocking authority. Namely, neither of the first and second manual setting devices 26 and 27 of any of the plurality of door locks 20 can be independently operated for setting the respective locking mechanism 24 to the unlocked state. As a result, all doors are closed with their latches 23 in the latching position, preventing opening of the doors.

On the other hand, when the control device 33 identifies that the enabling identification information in the unlocking device 40 matches with the comparison identification information in the main memory 36 (the unlocking device 40 is identified as being correct), the plurality of door locks 20 obtains independent unlocking authority (step S108). Namely, each and every of the plurality of door locks 20 can operate independently. Specifically, the control device 33 actuates none of the electric setting devise 30 of the plurality of door locks 20, such that the locking mechanisms 24 of the plurality of door locks 20 remain in their original states. Furthermore, each of the plurality of door locks 20 permits use of the first manual setting device 26 or the second manual setting device 27 to set the respective locking mechanism 24 to the locking state or unlocked state. Furthermore, each of the plurality of door locks 20 set in the locked state allows operation of the respective first handle 34A or the respective second handle 34B to actuate the respective latch driving device 22 to thereby retract the respective latch 23 to the unlatching position.

When the unlocking device 40 is physically removed from the control device 33, all door locks 20 connected to the control device 33 are set to the locking state and are locked, which is the first priority emergency state S105. Specially, after the enabling identification information in the unlocking device 40 is identified as being correct, if the unlocking device 40 is directly removed from the connector 38 of the control device 33, the control device 33 will enter the first priority emergency state S105, and the electric setting devices 30 of all door locks 20 are actuated by the control device 33 to set the locking mechanisms 24 of all door locks 20 to the locking state, such that the unlocking authority of all door locks 20 is revoked (S109). In this case, each door cannot be operated to set the respective locking mechanism 24 to the unlocked state by inserting a key to operate the first manual setting device 26 or the second manual setting device 27. Thus, the door cannot be opened by the first handle 34A. Namely, without physical connection between the unlocking device 40 and the control device 33, all door locks 20 lose the unlocking authority (S109) and cannot be independently operated to the unlocked state. This achieves a control function of avoiding easy opening of all doors from the outside while still permitting the latch 23 to move to the unlatching position by operating the second handle 34B at the inner side of the respective door even though all door locks 20 lose the unlocking authority (S109). Furthermore, after the control device 33 enters the first priority emergency state S105, the indicating devices 32 of all door locks 20 send out an emergent alarm signal.

At the same time of entering the first priority emergency state S105, the control module 33A of the control device 33 activates the alarm device 62 to generate an alarm message in the form of at least one of sound and light.

After all door locks 20 have lost their unlocking authority, a first-level report is sent out to a police system (step S111). Specifically, after the unlocking device 40 has been physically removed from the connector 38 of the control device 33 and all door locks 20 have lost the unlocking authority, the control device 33 actuates the safety reporting device 54 to inform the police system of the emergency event (such as an intrusion of an intruder into the school).

When the unlocking device 40 is physically reconnected to the control device 33, the control device 33 re-identifies whether the unlocking device 40 is correct (step S113). After the emergency event has been solved (e.g., the intruder has been arrested), the unlocking device 40 can be reconnected to the connector 38 of the control device 33 to enable the control device 33 to read the enabling identification information in the unlocking device 40.

When the control device 33 re-identifies again that the unlocking identification information of the unlocking device 40 as being incorrect, all door locks 20 are set to lose the unlocking authority (S115). Specifically, after the emergency event has been solved and the unlocking device 40 has been reconnected to the control device 33, when the control device 33 identifies the enabling identification information as being incorrect, the control device 33 enters a second identification failure state S115. All door locks 20 remain in the locking state and lose the unlocking authority.

When the control device 33 identifies the unlocking device 40 as being correct in step S113, the server 53 is logged in. For example, a computer or a smart device can be utilized to login the server 53 by a preset account and a password, connecting the server 53 with the control device 33 (step S117). After logging in the server 53, the manager can select whether to lift the first priority emergency state (S119). Namely, after logging in the server 53, when the first priority emergency state S105 is not lifted, all door locks 20 set in the locked state remain in the unlocking authority-revoked state (S131). On the other hand, after logging in the server 53 and after the control device 33 identifies the unlocking device 40 as being correct, when the first priority emergency state S105 is lifted, all door locks 20 set in the locking state restores the authority of independent locking and independent unlocking (S133). Furthermore, after the authority of independent locking and independent unlocking has been restored (S133), the control module 33A deactivates the alarm device 62 and stops operation of the indicating devices 32 of all door locks 20.

It is noted that after the first priority emergency state S105 is entered, even though the emergency event has been solved and the control device 33 identifies the unlocking device 40 as being correct, none of the door locks 20 is granted the unlocking authority. Specifically, all door locks 20 obtain the unlocking authority only after the unlocking device 40 is identified as being correct and the first priority emergency state S105 is lifted after the manager logs in the server 53 and lifts the first priority emergency state S105. After the unlocking authority is granted, the locking mechanism 24 of each of the plurality of door locks 20 can be set to the locking state or unlocked state through the first manual setting device 26 or the second manual setting device 27.

It is further noted that restoring the unlocking authority can be so set that all door locks 20 restore their states before entering the first priority emergency state S105. For example, in a case that a portion of all door locks 20 are independently set into the locking state and that the remaining portion of all door locks 20 are independently set into the unlocked state, after the first priority emergency state is lifted, the portion of all door locks 20 set into the locking state remains in the locking state but can be independently operated for unlocking purposes. Furthermore, after the first priority emergency state is lifted, the remaining portion of all door locks 20 set into the unlocked state restores the unlocked state and can be independently operated for locking purposes.

After the unlocking device 40 has been physically connected to the control device 33 and after logging in the server 53, a second priority emergency state can be set (step S201). When the second priority emergency state is not set, all door locks 20 remain the unlocking authority (S203). When the second priority emergency state is set, all door locks 20 are set into the locking state S205 and lose the unlocking authority. Specifically, after the unlocking device 40 is identified as being correct and the manager has logged in the server 53, the manager can use an interface of the server 53 to select whether to set the second priority emergency state. For example, in a case that an intruder intrudes the school while the manager is away from the control device 33 and, thus, cannot physically detach the unlocking device 40 from the control device 33, the manager can use the smart mobile device 50 to log in the server 53, and an icon representing the second priority emergency state can be pressed, such that the control device 33 sets the locking mechanisms 24 of all door locks 20 to the locked state while the control device 33 is physically connected to the unlocking device 40 and identifies the unlocking device 40 as being correct. Thus, all door locks 20 lose the unlocking authority. In this state, the latches 23 of all door locks 20 cannot move to the unlatching position by operating the first handles 34A but can move to the unlatching position by operating the second handles 34B. Furthermore, all door locks 20 cannot be independently set to the unlocking state. After the second priority emergency state is entered, the indicating device 32 of each of the plurality of door locks 20 sends out an emergency alarm signal.

While the second priority emergency state is entered, the control device 33 sends out a second-level report S206. After the second priority emergency state is set and all door locks 20 are set to the locking state, the status is reported to the police system. Specifically, the control device 33 activates the safety reporting device 54 to inform the police system of the emergency event (such as an intrusion by an intruder into the school).

At the same time of entering the second priority emergency state, the control module 33A of the control device 33 activates the alarm device 62 to generate an alarm message in the form of at least one of sound and light, such that a person (e.g., a person in the principal's office or a security office) near the control device 33 can be aware of the emergency state.

After logging in the server 53 while the unlocking device 40 is connected to the control device 33, the second priority emergency state can be optionally lifted (step S207). When the second priority emergency state is lifted, all door locks 20 restore the unlocking authority (S209) and the alarm device 62 stops. On the other hand, when the second priority emergency state is not lifted, all door locks 20 remain in the unlocking authority-revoked state. Specifically, after the emergency event has been solved (e.g., the intruder has been arrested) and the unlocking device 40 is identified as being correct, an icon (on the interface of the server 53) representing lifting the second priority emergency state can be pressed. Thus, all door lock 20 restore the unlocking authority (S209) and the alarm device 62 stops. If the icon representing lifting the second priority emergency state is not pressed, all door locks 20 remain in the unlocking authority-revoked state (S211) and the alarm device 62 continues to operate.

It is noted that when the second priority emergency state is entered and the unlocking device is physically removed from the connector 38 of the control device 33, the control device 33 enters the first priority emergency state S105. Thus, even though the server 53 is logged in and an icon is pressed to lift the first priority emergency state or the second priority emergency state, none of the door locks 20 restore the unlocking authority. Thus, even a robber robs the manager of the computer 52 or the smart mobile device 50, the robber cannot utilize the server 53 to restore the unlocking authority.

It is further noted that restoring the unlocking authority can be so set that all door locks 20 restore their states before entering the second priority emergency state. For example, in a case that a portion of all door locks 20 are independently set into the locking state and that the remaining portion of all door locks 20 are independently set into the unlocked state, after the second priority emergency state is lifted, the portion of all door locks 20 set into the locking state remains in the locking state but can be independently operated for unlocking purposes. Furthermore, after the second priority emergency state is lifted, the remaining portion of all door locks 20 set into the unlocked state restores the unlocked state and can be independently operated for locking purposes.

The emergency evacuation process according to the present invention further includes whether to enter a fire control state S301. When none of the fire detection devices 56 connected to the control device 33 detects a fire, each of the plurality of door locks retains its unlocking authority S303. When one of the plurality of fire detection devices 56 detects a fire, the control device 33 controls a portion of the plurality of door locks 20 associated with the position of the one of the plurality of fire detection devices 56 detecting the fire and revokes the unlocking authority of the portion of the plurality of door locks 20. Furthermore, at the same time of entering the fire control state S301, the control module 33A operates to generate an alarm message by activating the alarm device 62 to generate at least one of sound and light (step S302), such that the person near the control device 33 can be aware of the emergency state (the fire event).

In step S315, the location of at least one fire detection device 56 that has detected a fire is reported back to the server 53, and a symbol in the form of a flame is displayed on a corresponding location on the electronic map 66. With reference to FIGS. 4 and 5, specifically, when a fire occurs in a building and is detected by a corresponding fire detecting device 56, the location of the corresponding fire detecting device 56 is reported to the server 53, which, in turn, uses the emergency evacuation APP (installed on the personal device that has logged in the server 53) to display the location of the fire by a fire symbol (a flame) on the electronic map 66 through the emergency evacuation APP. Thus, every person that is in the place 68 (such as a school) and that has logged in the server 53 can be aware of the fire location 79 and, thus, can be evacuated to a location away from the fire location 79 based on the information provided.

Furthermore, the plurality of fire detection devices 56 can be disposed in proper locations in each building 78. When one of the plurality of fire detection devices 56 detects a fire, the control device 33 automatically sets a portion of the plurality of door locks 20 associated with the position of the one of the plurality of fire detection devices 56 to the locking state (S305). Thus, the associated doors cannot be opened, reducing the spreading speed of the fire. Furthermore, the control device 33 sends out a fire alarm report (S307). Namely, after a fire control state is entered, the control device 33 uses the fire reporting device 58 to report the fire to the fire system, and the firemen can reach the fire site at the first moment to extinguish the fire.

Next, the fire control state can be lifted (S309). If the fire control state is not lifted, the portion of the plurality of door locks 20 set to the locking state owing to the fire loses the unlocking authority (S311), and the alarm device 62 keeps operating to generate the alarm. After logging in the server 53 while the unlocking device 40 is connected to the control device 33, the fire control state can be optionally lifted to restore the unlocking authority (S313), and the alarm is deactivated to stop the alarm device 62 (S314). Furthermore, the fire location 79 is erased from the electronic map 66 on the personal device (the fire symbol in the form of a flame is not displayed). Specifically, after the fire has been put out, the manager can log in the server 53 while the unlocking device 40 is physically connected to the connector 38 of the control device 33 and is identified as being correct. Then, the manager can press an icon representing lifting of the fire control state, such that the portion of the plurality of door locks 20 (set to the locking state owing to the fire) restores the unlocking authority, and the control module 33A deactivates the alarm to stop the alarm device 62 (S212). On the other hand, when manager does not press the icon representing lifting of the fire control state, the portion of the plurality of door locks 20 (set to the locking state owing to the fire) remains in the unlocking authority-revoked state, and the alarm device 62 keeps operating to generate the alarm.

It is further noted that restoring the unlocking authority can be so set that all door locks 20 restore their states before entering the fire control state. For example, in a case that a portion of all door locks 20 are independently set into the locking state and that the remaining portion of all door locks 20 are independently set into the unlocked state, after the fire control state is lifted, the portion of all door locks 20 set into the locking state remains in the locking state but can be independently operated for unlocking purposes. Furthermore, after the fire control state is lifted, the remaining portion of all door locks 20 set into the unlocked state restores the unlocked state and can be independently operated for locking purposes.

Next, a third priority emergency state can be set (step S401). The remote controller 60 can be used to remotely set at least one of the plurality of door locks 20 to the locking state. If the third priority emergency state is not set, all door locks 20 retains the unlocking authority (step S403). In a case that a portion of the plurality of door locks 20 is set to the locking state (step S405), when the third priority emergency state is set, the portion of the plurality of door locks 20 set to the locking state loses the unlocking authority. Furthermore, an alarm is generated when the third priority emergency state is entered (step S408). The control module 33A activates the alarm device 62 to generate an alarm message notifying a person near the control device 33 of entrance of the third priority emergency state. Specifically, the remote controller 60 matches with the receiver 39 of each of the plurality of door locks 20. When the unlocking device 40 is identified as being correct, one or more of the plurality of door locks 20 within a certain range are set to the locking state and lose the unlocking authority (cannot be set to the unlocked state by the first manual setting device 26 or the second manual setting device 27). Furthermore, all door locks 20 send out an emergent alarm signal through the indicating devices 32 and send a signal back to the control device 33, such that the control module 33A activates the alarm device 62 to generate an alarm message (step S408), notifying a person near the alarm device 62 of entrance of the third emergency state through the alarm message. Thus, the manager in a location away from the control device 33 can set the desired door locks to the locking state under emergency. As a result, the manager can set at least one of the plurality of door locks 20 within a smaller area more quickly than setting the second priority emergency state through log-in of the server 53. Furthermore, a third-level report (step S406) can be reported to the police system after setting the third priority emergency state.

Next, the third priority emergency state can be lifted (step S407). Specifically, the server 53 is logged in while the unlocking device 40 is identified as being correct, and lifting of the third priority emergency state can be executed. When lifting of the third priority emergency state is not executed, a portion of the plurality of door locks 20 set to the locking state remains in the unlocking authority-revoked state (step S409) and the alarm device 62 keeps operating. When the lifting of the third priority emergency state is executed, the portion of the plurality of door locks 20 set to the locking state restores the unlocking authority (step S411), and the alarm device 62 is deactivated to stop the alarm device 62 (step S410).

Figure 3:
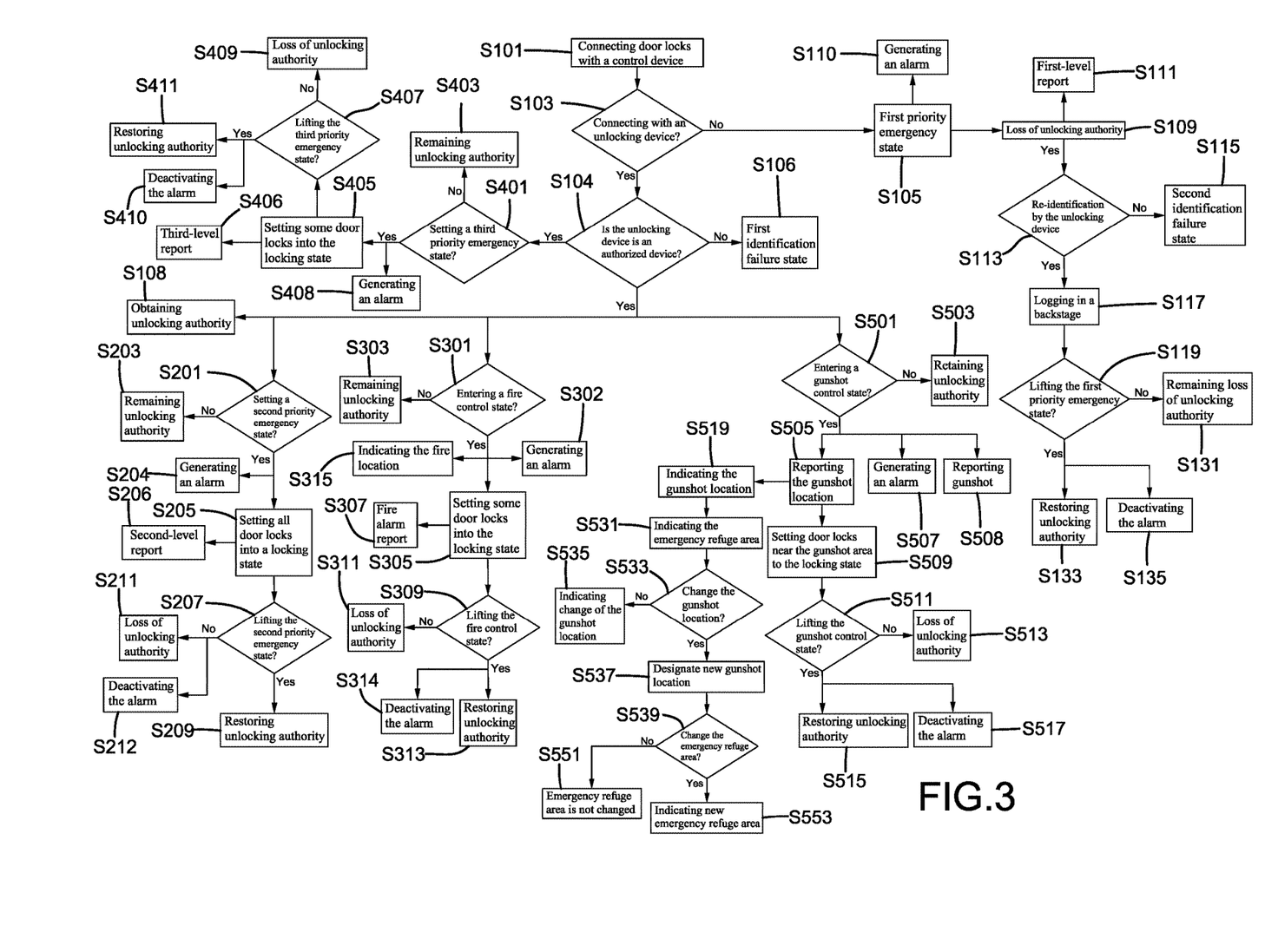
FIG. 3 is another diagrammatic flowchart illustrating the emergency evacuation process according to the present invention.

The next step S501 is to detect whether to enter a gunshot control state. When a gunshot event is detected by any one of the plurality of gunshot detection devices 61, the gunshot location is reported to the control device 33 and the server 53 (S505). Specifically, each of the plurality of gunshot detection devices 61 has an independent hardware identification number, and a gunshot location database is created according to the hardware identification numbers. When any one of the plurality of gunshot detection devices 61 detects a gunshot event, the gunshot detection device 61 detecting the gunshot event sends a reporting signal including its own hardware identification number, such that the control module 33A receiving the reporting signal can know the approximate location where the gunshot event occurs.

An alarm is generated while entering the gunshot control state (see S507). In step S507, the control module 33A activates the alarm device 62 to generate at least one of sound and light, such that the person near the control device 33 (such as the principal in the principal's office or a guard in the security office) can be aware of the gunshot event through the alarm device 62. Furthermore, the indicating device 32 of each of the plurality of door locks 20 is activated by the control device 33 to generate an emergency alarm signal, notifying persons at places other than the gunshot location. On the other hand, when no gunshot event is detected by the plurality of gunshot detection devices 61, the gunshot control state is not entered.

In step S519, the person holding the personal device is informed of a gunshot location 70 through use of the emergency evacuation APP. Specifically, when the gunshot control state is entered, the server 53 automatically uses the emergency evacuation APP of the personal device (such as the smart mobile device 50) that has logged in the server 53 to display the gunshot location 70 by a square symbol on the electronic map 66. Thus, every person in the school can know the location of the gunman by the electronic map 66. Furthermore, the electronic map 66 indicates the location of the person holding the personal device by a dot. Thus, the person holding the personal device can know the distance between him or her and the gunshot location 70.

The electronic map 66 can include a text area 80 to more specifically describe the gunshot location 70. For example, the place 66 shown in FIGS. 4 and 5 can be a plan view of all buildings of the school without showing the floor disposition of each building, such that the electronic map 66 can only know the building 78 where the gunshot event occurs but cannot know the exact floor or exact space. The text area 80 can clearly show the precise location of the gunshot event. For example, the text area 80 can show that the gunshot event occurs at Room A at the third floor. Thus, the persons in the same building 78 can avoid encounter with the gunman.

In step S531, the person holding the personal device is informed of one of the first, second, and third emergency refuge areas 74, 76, and 77. Specifically, a star symbol is shown on the electronic map 66 to designate or suggest the first, second, or third emergency refuge area 74, 76, or 77. In an example shown in FIG. 4, the second emergency refuge area 76 is labeled with a star symbol. In another example shown in FIG. 5, the third emergency refuge area 77 is labeled with a star symbol. Thus, every person in the place 68 can rapidly know where to take refuge.

It is worth noting that selection of the first, second, or third emergency refuge area 74, 76, or 77 can be determined based on the distance to the gunshot location 70 or the person holding the personal device. In an example shown in FIG. 4, the second emergency refuge area 76 is most distant from the gunshot location 70, such that the star symbol is displayed on the second emergency refuge area 76 instead of first and third emergency refuge areas 74 and 77 near to the gunshot location 70. In another example shown in FIG. 5 in which no gunshot event occurs, a star symbol is shown in the third emergency refuge area 77 nearest to the personal location 72 rather than the first and second emergency refuge areas 74 and 76.

In step S533, it is determined whether the gunshot location 70 is changed. Specifically, when a new gunshot occurs in another location other than the original gunshot location 70, the new gunshot location is designated (step S537). On the other hand, when no gunshot occurs in another location other than the original gunshot location 70, the gunshot location 70 is not changed. In a case that the gunman moves and fires at another location, another gunshot detecting device 61 detects this gunshot and reports the new gunshot event to the server 53. The server 53 updates the gunshot location 70 on the electronic map 66 through the emergency evacuation APP (see the change from FIG. 4 to FIG. 5). When the gunshot detecting devices 61 detect no gunshot, the gunshot location 70 on the electronic map 66 is not changed.

In step S539, it is determined whether to change the designated emergency refuge area. When the new gunshot location 70 is not the same as nor adjacent to the previous gunshot location, the emergency refuge area is not changed (Step S551). On the other hand, when the new gunshot location is the same as or adjacent to the previous gunshot location, a new emergency refuge area is designated (step S553). In a case that the gunman moves, the original designated emergency refuge area could become unsafe. In the example shown in FIG. 5, it is assumed that the second emergency refuge area 76 is designated as the original emergency refuge area (see the star symbol), when the detected new gunshot location 70 is relatively near the second emergency refuge area 76 (which becomes relatively risky now), a new emergency refuge area will be designated, such as the third emergency refuge area 77 with the star symbol. Nevertheless, when the new gunshot location 70 is still far away from the original designated emergency refuge area (e.g., the second emergency refuge area 76), it is not necessary to change the designated refuge area (namely, the star symbol remains in the same location).

Furthermore, in step S501 the gunshot event is reported at the same time of entrance of the gunshot control state S501. Specifically, the gunshot emergency is reported to the gunshot system through the safety reporting device 54, such that the police can reach the gunshot location in the shortest time. Furthermore, the police can use its own personal device (such as a smart mobile device) to install the emergency evacuation APP and to log in the server 53, thereby obtaining information of the electronic map 66 and the gunshot location 70 in the place 68 (such as a school). Thus, the police can simulate an attack route or an attach plan based on the information.

At least one of the plurality of door locks 20 near the gunshot location is set to the locking state (step S509). Specifically, the control module 33A of the control device 33 sets the at least one of the plurality of door locks 20 near the gunshot location to the locked state according to the hardware identification number contained in the reporting signal sent by the gunshot detection device 61 that detects the gunshot. Thus, the at least one of the plurality of door locks 20 loses its unlocking authority to prevent or delay the gunman from passing through the respective door or doors, reducing the casualty. Furthermore, after the door locks 20 loss the unlocking authority, the second handle 34B on the inner side of the indoor space can still be operated to move the latch 23 from the latching position to the unlatching position, whereas operation of the first handle 34A cannot move the latch 23. Thus, the person can still move to the emergency refuge area (one of the first, second, third emergency refugee areas 74, 76, and 77) labeled with the star symbol on the electronic map 66.

It is then determined whether the gunman is arrested to decide whether to lift the gunshot control state (step S511). When the gunman is not arrested, the at least one of the plurality of door locks 20 still loses its unlocking authority (step S513). On the other hand, when the gunman is arrested, the at least one of the plurality of door locks 20 set to the locking state restores its unlocking authority (step S515) to permit independent operation. At the same time, the alarm is deactivated to stop the alarm device 62 (step S517). It is noted that after the gunshot control state is lifted, the square symbol designating the gunshot location 70 is removed from the electronic map 66.

In the emergency evacuation process according to the present invention, the first priority emergency state is entered when the unlocking device 40 is physically detached from the control device 33, such that all door locks 20 are set to the locking state and lose the unlocking authority. This can be applied in places like schools or government authorities to enable a rapid response when an emergency event occurs. For example, when an intruder intrudes a school, all door locks 20 are set to the locking state by entering the first priority emergency state, effectively hindering the intruder.

In the emergency evacuation process according to the present invention, when the unlocking device 40 is identified as being correct, the computer 52 or the smart mobile device 50 can be used to log in the server 53 for setting the second priority emergency state, simultaneously setting all door locks 20 to the locking state and revoking the unlocking authority of all door locks 20. Thus, even though the manager is not near the control device 33 and cannot physically detach the connector 38 of the control device 33 from the unlocking device 40 in time, the manager can still remotely control all door locks 20 to the locking state.

In the emergency evacuation process according to the present invention, the remote controller 60 can be used to set one or more of the plurality of door locks 20 within a certain area to the locking state and to revoke the unlocking authority of the one or more of the plurality of door locks 20. Furthermore, the manager or a sub-manager having a lower managing authority can rapidly set the door locks 20 according to the actual situation.

In the emergency evacuation process according to the present invention, when the first, second, or third priority emergency state or the gunshot control state is entered, the control device 33 can use the safety reporting device 54 to report the emergency event (such as an intrusion by an intruder) to the police system, improving the reporting efficiency.

The emergency evacuation process according to the present invention provides detection and control of a gunshot to rapidly detect the gunshot location 70, and the control device 33 can be used to rapidly set the door locks 20 near the gunshot location 70 to the locking state and to revoke the unlocking authority, delaying or stopping the gunman from moving to another location.

The emergency evacuation process according to the present invention rapidly provides the gunshot location 70 and the suggested emergency refuge area 74, 76, or 77 after entrance of the gunshot control state. Thus, the persons in the place 68 can immediately know the gunshot location 70 and where to take refuge, reducing the casualty.

When the gunshot control state is reentered, the emergency evacuation process according to the present invention provides the personal location 72 of the person holding the personal device and the gunshot location 70, such that the person can rapidly judge whether he or she is in a safe place.

The emergency evacuation process according to the present invention can immediately change the suggested emergency refuge area according to the newest gunshot location, enabling the person to avoid the gunner.

In the emergency evacuation process according to the present invention, after the fire control state is entered, a portion of the door locks 20 within the fire control area can be set to the locking state and loses the unlocking authority, such that the closed doors can temporarily stop the fire from spreading. Furthermore, after the fire control state is entered, the fire system can be informed at the first moment, reducing the time for the firemen to reach the fire site.

After entering the fire control state, the emergency evacuation process according to the present invention provides the personal location 72 of the person holding the personal device and the gunshot location 70, such that the person can rapidly judge whether he or she is in a safe place and where to evacuate.

Now that the basic teachings of the present invention have been explained, many extensions and variations will be obvious to one having ordinary skill in the art. For example, the personal device is not limited to smart mobile devices and can be in the form of a portable mobile device, such as a notebook computer, a smart watch, etc.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. An emergency evacuation process comprising:
   installing an emergency evacuation application into a personal device, executing the emergency evacuation application, and connecting the personal device with a server;
   connecting a plurality of door locks in a place with a control device, with the control device obtaining control authority of each of the plurality of door locks and being in connection with the server;
   connecting an unlocking device with the control device, with the control device identifying the unlocking device, wherein the control device actuates and sets all of the plurality of door locks to a locking state when the unlocking device is identified as being incorrect, and wherein each of all of the plurality of door locks obtains unlocking authority when the unlocking device is identified as being correct;
   detecting whether a gunshot event occurs, wherein each of the plurality of door locks retains the unlocking authority when no gunshot event is detected, wherein a gunshot event information containing a gunshot location of the gunshot event is sent to the server when the gunshot event is detected;
   setting at least one of the plurality of door locks near the gunshot location to the locking state and revoking the unlocking authority of the at least one of the plurality of door locks, and entering a gunshot control state;
   indicating the gunshot location on the personal device through the emergency evacuation application;
   indicating a pre-set emergency refuge area on the personal device through the emergency evacuation application;
   selectively lifting the gunshot control state after logging in the server, wherein when the gunshot control state is lifted, the at least one of the plurality of door locks near the gunshot location restores the unlocking authority.

2. The emergency evacuation process as claimed in claim 1, wherein the pre-set emergency refuge area is selected from a plurality of emergency refuge areas in the place.

3. The emergency evacuation process as claimed in claim 1, wherein the pre-set emergency refuge area is one of the plurality of emergency refuge areas that is farthest to the gunshot location.

4. The emergency evacuation process as claimed in claim 1, wherein the pre-set emergency refuge area is one of the plurality of emergency refuge areas that is nearest to a person holding the personal device.

5. The emergency evacuation process as claimed in claim 1, wherein at least one of the gunshot location and the pre-set emergency refuge area is described by text.

6. The emergency evacuation process as claimed in claim 1, further comprising: creating an electronic map based on disposition of the place, and storing the electronic map in the server, wherein indicating the gunshot location includes indicating the gunshot location by a symbol on the electronic map when the gunshot control state is entered, and wherein indicating the pre-set emergency refuge area includes indicating the pre-set emergency refuge area by another symbol when the gunshot control state is entered.

7. The emergency evacuation process as claimed in claim 6, wherein the symbol indicating the gunshot location is a square, and wherein the another symbol indicating the pre-set emergency refuge area is a star.

8. The emergency evacuation process as claimed in claim 6, further comprising: reporting a personal location indicative of a location of the person holding the personal device to the server, and labeling the personal location on the electronic map by a dot.

9. The emergency evacuation process as claimed in claim 8, wherein reporting the personal location is based on connection between the personal device and one of the plurality of door locks, and the one of the plurality of door locks connected to the personal location is identified as the personal location.

10. The emergency evacuation process as claimed in claim 1, further comprising:
    determining whether to change the gunshot location, wherein a new gunshot location is designated when a new gunshot event is detected, and wherein the gunshot location is not changed when no new gunshot event is detected; and
    determining whether to change the pre-set emergency refuge area, wherein the pre-set emergency refuge area is not changed when the new gunshot location is same as or near the pre-set emergency refuge area, and wherein when the new gunshot location is not the same as nor near the pre-set emergency refuge area, a new emergency refuge area is indicated.

11. The emergency evacuation process as claimed in claim 1, further comprising:
    reporting the gunshot event to a police system while the server receives information of the gunshot event;
    generating an alarm when the control device receives the gunshot location information of the gunshot event; and
    deactivating the alarm when the gunshot control state is lifted.

12. The emergency evacuation process as claimed in claim 1, further comprising:
    simultaneously setting all of the plurality of door locks connected to the control device into the locking state when the unlocking device is physically removed from the control device, and the control device enters a first priority emergency state, wherein all of the plurality of door locks lose the unlocking authority and are incapable of being unlocked independently;
    sending a first-class report to a police system after all of the plurality of door locks have lost the unlocking authority;
    physically reconnecting the unlocking device with the control device, with the control device re-identifying the unlocking device, wherein all of the plurality of door locks remain in the locking state and lose the unlocking authority when the unlocking device is re-identified by the control device as being incorrect;

logging in a server and connecting the server with the control device when the unlocking device is re-identified by the control device as being correct;

selectively lifting or not lifting the first priority emergency state after logging in the backstage, wherein all of the plurality of door locks set in the locking state remain in losing the unlocking authority when the first priority emergency state is not lifted, and wherein all of the plurality of door locks set in the locking state restore the unlocking authority and a locking authority and are capable of being operated independently when the first priority emergency state is lifted while the unlocking device is re-identified by the control device as being correct;

selectively setting or not setting a second priority emergency state after logging in the server while the unlocking device is physically connected to the control device, wherein all of the plurality of door locks retain respective unlocking authority when the second priority emergency state is not set, and wherein all of the plurality of door locks are set to the locking state and lose the unlocking authority when the second priority emergency state is set;

sending a second-level report to the police system when the second priority emergency state is set and all of the plurality of the door locks are set to the locking state; and selectively lifting or not lifting the second priority emergency state after logging in the server while the unlocking device is connected to the control device, wherein all of the plurality of door locks restore the unlocking authority when the second priority emergency state is lifted, and wherein all of the plurality of door locks lose the unlocking authority when the second priority emergency state is not lifted.

13. The emergency evacuation process as claimed in claim 6, further comprising:

selectively setting or not setting a third-level emergency state, wherein the third-level emergency state is set by using a remote controller to remotely set at least one of the plurality of door locks in an area into a locking state, and the at least one of the plurality of door locks loses the unlocking authority when the third-level emergency state is set, wherein all of the plurality of door locks retain the unlocking authority when the third-level emergency state is not set;

reporting to the police system after the third-level emergency state is set; and selectively lifting or not lifting the third-level emergency state after using the computer or the smart mobile device to log in the server while the unlocking device is identified as being correct, wherein the at least one of the plurality of door locks set in the locking state remains in loss of the unlocking authority when the third-level emergency state is not lifted, and wherein the at least one of the plurality of door locks set in the locking state restores the unlocking authority when the third-level emergency state is lifted.

14. The emergency evacuation process as claimed in claim 13, further comprising: reporting the fire location of at least one fire detecting device that has detected the fire to the server, and labeling the fire location with a flame symbol on the fire location electronic map.

15. The emergency evacuation process as claimed in claim 12, wherein each of the plurality of door locks includes an indicating device, wherein each indicating device sends out an emergency alarm signal when one of the first emergency state, the second emergency state, the third emergency state, and the gunshot control state is entered.

16. The emergency evacuation process as claimed in claim 13, further comprising:

connecting the control device with a fire detection device, wherein each of the plurality of door locks retains the respective unlocking authority when the fire detection device detects no presence of a fire, and wherein the control device sets a portion of the plurality of door locks near the fire into the locking state when the fire detection device detects the presence of a fire, wherein the portion of the plurality of door locks lose the unlocking authority, wherein the control device enters a fire control state, and wherein the fire is reported to a fire system through a fire reporting device connected to the control device; and selectively lifting or not lifting the fire control state, wherein the portion of the plurality of door locks set in the locking state owing to the fire loses the unlocking authority when the fire control state is not lifted, and the portion of the plurality of door locks set in the state owing to the fire restores the unlocking authority when the fire control state is lifted after logging in the backstage while the unlocking device is connected to the control device.

17. The emergency evacuation process as claimed in claim 13, wherein each of the plurality of door locks includes an indicating device, wherein each indicating device sends out an emergency alarm signal when the fire control state is entered.

* * * * *